Aug. 22, 1967 M. EL-ROY 3,337,421
DIRECTLY CONTACTING FEED LIQUID WITH VAPORIZED
HEAT EXCHANGE LIQUID IMMISCIBLE WITH FEED
Filed Feb. 3, 1965
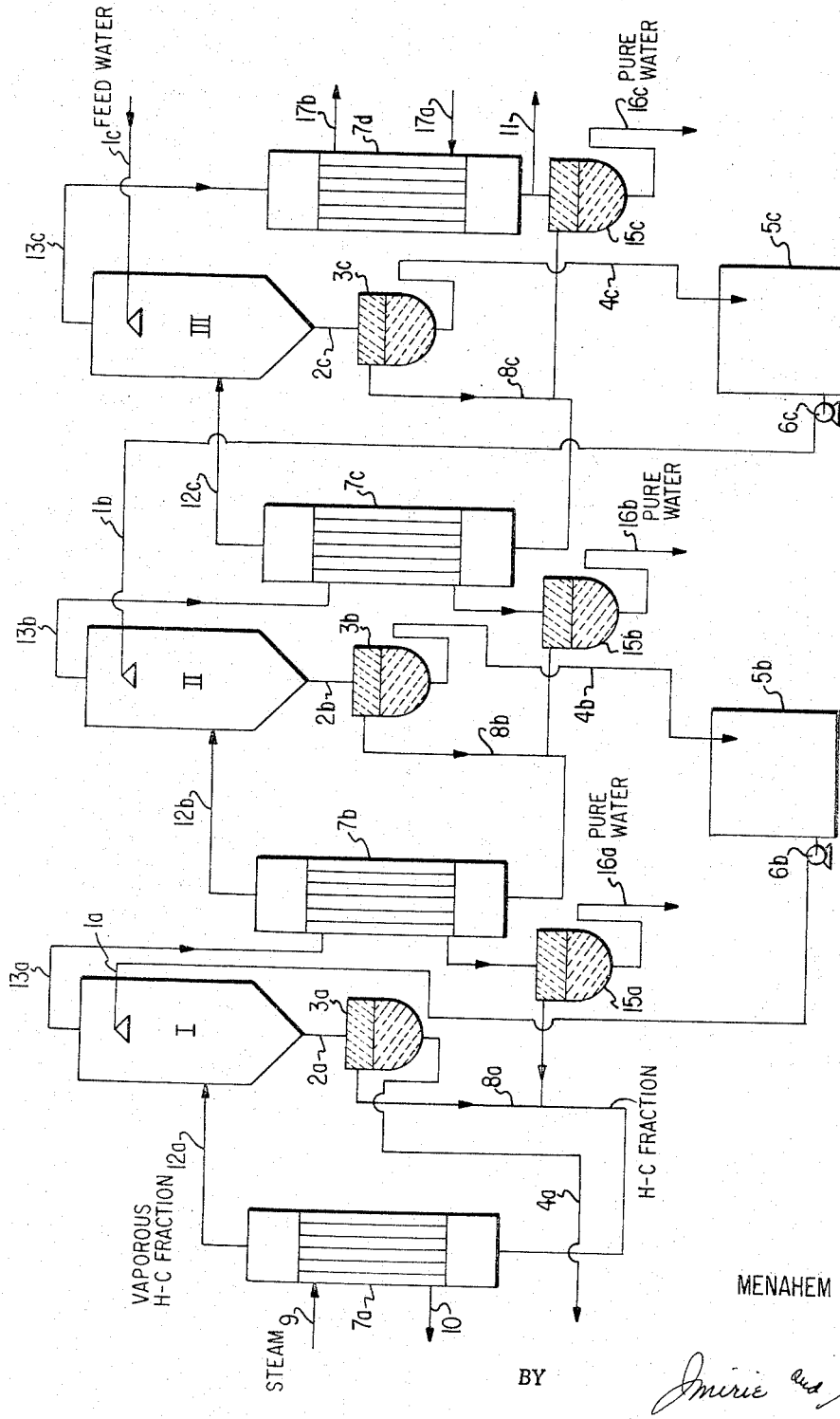
INVENTOR.
MENAHEM EL-ROY
BY
ATTORNEYS 3,337,421
DIRECTLY CONTACTING FEED LIQUID WITH VAPORIZED HEAT EXCHANGE LIQUID IMMISCIBLE WITH FEED
Menahem El-Roy, Haifa, Israel, assignor to Israel Mining Industries—Institute of Research and Development, Haifa, Israel, a company of Israel
Filed Feb. 3, 1965, Ser. No. 430,039
Claims priority, application Israel, Mar. 30, 1964, 21,073
7 Claims. (Cl. 203—11)

ABSTRACT OF THE DISCLOSURE

A heat carrier liquid is used in vaporized form in direct contact with the feed liquid to be concentrated, the two liquids being immiscible. Some of the vaporized heat carrier liquid is condensed so that its latent heat vaporizes some of the feed liquid, the resultant liquids being separated and the resultant vapors being used to supply heat to vaporize heat carrier liquid for another evaporator stage. The heat carrier liquids for the several evaporator stages may be the same, or they may be different liquids.

---

This invention relates to multiple-effect evaporating methods and evaporators and is concerned in particular with the evaporation of water from aqueous systems which are difficult to handle by conventional multiple-effect evaporators.

In conventional multiple-effect methods and evaporators the aqueous system constituting the feed is carried through a series of two or more stages, called "effects," in each of which it is indirectly heated. At one terminal effect of the series live steam derived from an external source is used as a heating medium, while the heating medium used in each following effect is the vapor evolved in the preceding effect. In all effects the heating is indirect in that the live steam in the first effect, or in each following effect the vapors produced in the preceding effect, give of their heat, in conventional heat exchangers, to the feed concentrated or being concentrated. The main drawback of these known multiple-effect evaporators is the scale-formation on the heat exchange surfaces, which impairs the heat transfer, lowers the rate of concentration that can be achieved, and makes frequent de-scaling operations necessary. Moreover, in the case of special corrosion-resistant equipment, temperatures of about 140° C. and pressures of about 4 to 6 atmospheres gauge must as a rule not be exceeded in the first effect, which means that the temperatures and pressures in the following effects will be correspondingly lower.

For single-effect evaporation it has already been suggested to overcome these limitations by avoiding the indirect heating and heating the aqueous system directly by means of "heat-carriers," i.e. substances which are liquid in the lower region of the operating temperature and boil in the higher region thereof, and which are immiscible with the aqueous system and chemically inert to its components. Hydrocarbons are typical representatives of such heat carriers. Vapors of the heat carrier generated outside the evaporating vessel are introduced directly into the aqueous system in the evaporating vessel where they condense at least partly, giving off to the aqueous system both their sensible and latent heat, whereby some of the water and possibly other volatile substances of the aqueous system are evaporated. Apart from eliminating the drawbacks of the indirect heating set out above, the use of heat carriers also provides the advantage of making the evaporators less subject to attack by corrosive substances contained in the aqueous system than they are in the case of indirect heating. In indirectly heated evaporators the thin, vulnerable heat exchange surfaces are the zones exposed to the highest temperature while in the case of direct heating the highest temperature prevails in the zone where the heat carrier is introduced into the aqueous system, and this can be remote from the walls of the evaporator.

The invention consists in a method for the multiple-effect evaporation of aqueous system, wherein the aqueous feed to one terminal effect of a series of two or more effects is heated directly by heat carrier vapors generated by extraneous heat, and the aqueous feed in each further effect is heated directly by heat carrier vapors produced indirectly by the mixture of heat carrier and water vapors produced in the preceding effect, which mixture is thereby condensed; the condensates thus formed, and the mixtures of feed and condensed heat carrier discharged from each effect, are allowed to stratify, and the liquid heat carrier layers are separated from the aqueous phases and, if desired, recycled into heating cycle.

The same heat carrier may be used in all effects, or different heat carriers may be used in some or all effects.

The various feeding methods used in conventional multiple-effect evaporation are applicable to this invention, especially forward feed in which fresh feed is introduced into the same effect as are the externally generated heat carrier vapors; backward feed in which the fresh feed is introduced into the terminal effect opposite to the one that is supplied with the externally generated heat carrier vapors; and parallel feed where fresh feed is supplied to each effect in parallel.

The embodiment of the invention in which different heat carriers are used in some or all effects, has no counter-part in conventional multiple-effect evaporation methods. This manner of carrying out the invention provides a high degree of variability and flexibility as regards the adjustment of the conditions of temperature and pressure in each effect.

The various possibilities termed "mixed feed" in conventional multiple-effect evaporation are applicable to the method according to this invention with either single-heat-carrier or multiple-heat-carrier heating.

Moreover, the known device of thermocompression of the vapors may equally be resorted to in a multiple-effect evaporator according to the invention.

Suitable heat carriers for use in the method according to the invention are, for example: hydrocarbons, especially petroleum fractions of the desired boiling ranges, e.g. petroleum ether (44–55° C.), white spirit (140–160° C.), kerosene (250–280°); ethers such as di-n-butyl, di-n-amyl, di-isoamyl and similar ethers; halogenated hydrocarbons; and the like.

The method according to the invention eliminates the drawbacks of known evaporating methods by indirect heating, especially in those cases where heavy scaling and corrosion due to the composition of the aqueous feed puts the heat exchangers out of operation or makes the application of multiple-effect evaporation altogether impossible. The invention is, moreover, of great advantage for the concentration of solutions or dispersions of heat-sensitive substances such as antibiotics produced by fermentation, enzymes and the like.

The invention also provides a multiple-effect evaporator for carrying out the method aforesaid, which comprises a number of evaporating vessels equal to the number of effects; a heat exchanger coordinated to each effect for evaporating the heat carrier to be used in this effect, the heat exchanger of the first effect being heatable by an extraneous heating medium, and the heat exchanger of each subsequent effect being heatable by the mixture of water vapour and heat carrier vapour produced in the preceding effect; a separator coordinated to each of the heat exchangers of the second and further effects for the separation of the condensed vapours into a heat carrier phase and an aqueous phase; and a separator coordinated to each evaporating vessel for the separation of the liquid bottom output thereof into a heat carrier phase and an aqueous phase.

A multiple-effect evaporator according to the invention is illustrated diagrammatically, and by way of example only, in the accompanying drawing.

This is a triple-effect evaporator comprising a series of three evaporating vessels I, II, III. As is usual in the description of multiple-effect evaporators, the first effect, in this case I, is the one to which the heating medium is supplied at the highest temperature occurring in the entire system. According to whether the feeding method is forward or backward, the fresh feed of the aqueous system is supplied to effect I or III. In the case here illustrated, the feed enters first the effect III, which makes this a backward feed.

The feed circulation system of the evaporator includes supply conduits $1a$, $1b$, $1c$ connected, respectively, to the top of the three evaporating vessels; discharge conduits $2a$, $2b$, $2c$ connecting the bottoms of the evaporating vessels to separators $3a$, $3b$, $3c$; intermediate collecting tanks $5b$ and $5c$ for receiving concentrate from the separators $3b$, $3c$, through pipes $4b$, $4c$, respectively, and a discharge pipe $4a$ leading the concentrate from the separator $3a$ out of the evaporator. Circulation pumps $6b$, $6c$ are provided for feeding the concentrate onwards from tanks $5b$, $5c$.

The heat carrier system of the first effect includes a heat exchanger $7a$, the separator $3a$, and a condensate return pipe $8a$. In the heat exchanger $7a$, an extraneous heating medium entering through 9 and leaving through 10 evaporates the heat carrier which is fed in the liquid state to the heat exchanger from the separator $3a$. The heat carrier vapours are discharged through conduit $12a$ into the vessel I where a portion thereof condenses. The condensate is discharged together with the aqueous concentrate through conduit $2a$ into the separator $3a$ and flows through conduit $8a$ into the heat exchanger $7a$. By the condensation of a portion of the heat carrier, some water is evaporated from the aqueous system in vessel I; the water vapor and the not-condensed portion of the heat carrier escape through conduit $13a$ into the heat exchanger $7b$ of the second effect.

The second effect includes a heat exchanger $7b$, a vapor conduit $12b$, the separator $3b$ and a return conduit $8b$ from the latter to the heat exchanger $7b$. In this heat exchanger, liquid heat carrier is evaporated by exchange of heat with the vapor mixture produced in the vessel I and arriving through conduit $13a$, which mixture is thereby condensed. The condensate flows through a conduit $14a$ into a separator $15a$ from which the heat carrier returns via the conduit $8a$ to the heat exchanger $7a$ while the water is discharged through a pipe $16a$. The heat carrier vapor generated in the heat exchanger $7b$ flows through conduit $12b$ into the vessel II where a portion thereof condenses and evaporates some water. The water vapor and residual heat carrier vapor escape through conduit $13b$. The heat carrier condensate and concentrate formed in vessel II are discharged through pipe $2b$ into the separator $3b$ from which the liquid heat carrier returns to the heat exchanger $7b$ while the concentrate flows into the tank $5b$.

The third effect includes a heat exchanger $7c$, a vapor conduit $12c$ and a heat carrier condensate return conduit $8c$. In the heat exchanger, liquid heat carrier is evaporated by exchange of heat with the vapor mixture produced in the vessel II and arriving through conduit $13b$, which mixture is thereby condensed; the condensate flows off through conduit $14b$ to the separator $15b$ from which the liquid heat carrier returns via conduit $8b$ to the heat exchanger $7b$ while the water is discharged through pipe $16b$. The heat carrier vapor flows from the heat exchanger $7c$ through conduit $12c$ into vessel III where it produces a mixture of water vapor and heat carrier vapor, which is discharged through pipe $13c$ into heat exchanger $7d$. The latter is cooled by an extraneous coolant fed in at $17a$ and withdrawn at $17b$. The condensate is discharged into separator $15c$ from which the liquid heat carrier returns via the conduit $8c$ to the heat exchanger $7c$ while the water is drained off through pipe $16c$. The heat carrier condensate forming in vessel III is discharged with the concentrate through pipe $2c$ into separator $3c$ from which the heat carrier returns through conduit $8c$ to the heat exchanger $7c$ while the concentrate flows off through pipe $4c$ into tank $5c$.

A vacuum duct 11 is connected to conduit $13c$ downstream of the heat exchanger $7d$; and vacuum ducts may similarly be connected to the first and second effects, whereby a state of reduced pressure can be set up in each effect.

In the evaporator described hereinbefore each effect has a self-contained circuit for the circulation of the heat carrier. The same evaporator can, therefore, be operated at will with one and the same substance serving as heat carrier in all effects, or with different heat carriers.

The following examples illustrate the application of the method according to the invention, with the aid of a triple-effect evaporator corresponding in principle to the one schematically described above, to various concentrating operations.

*Example 1*

The feed consisted of wet-process phosphoric acid of a concentration of 34% by weight. The evaporating vessels consisted of stainless steel and had a capacity of 12 liters each. The rate of feed was 100 kg./hour, the operation of the evaporator was by backward feed with thermocompression of the heat carrier vapors between the first and second effects. The heat carrier consisted of di-n-butyl ether (B.P. 142° C.) of which 270 kg./hr. was evaporated in the first effect.

The following Table 1 shows the concentration and temperature of the phosphoric acid rising from effect to effect; the vapor pressure in each effect, and the composition and temperature of the vapors being discharged from the evaporating vessel of each effect.

TABLE 1

| Effect | Feed, Percent $H_3PO_4$ | Product | | Vapors | | Pressure, mm. Hg |
|---|---|---|---|---|---|---|
| | | $H_3PO_4$ | ° C. | Composition[1] | ° C. | |
| 3rd | 34 | 44 | 90 | 67% C / 33% W | 85 | 525 |
| 2nd | 44 | 60 | 115 | 60% C / 40% W | 105 | 1,290 |
| 1st | 60 | 85 | 179 | 75% C / 25% W | 131 | 2,280 |

[1] C = heat carrier; W = water.

*Example 2*

The evaporator included three evaporating vessels of stainless steel, having a capacity of 12 liters each, and was operated by a mixed feeding method, namely: backward feed from the third to the first effect, and forward feed from the second to the third effect.

The feed consisted of aqueous 10% by weight sodium hydroxide and was supplied to the second effect at a rate of 90 liters per hour. The heat carriers were: 340 kg. of a kerosene fraction of boiling range 250 to 280° C. in the first effect; 310 kg. of white spirit fraction of B.P. 150° C. in the second effect; and 300 kg. of the same white spirit in the third effect.

Table 2 below tabulates the operating conditions:

TABLE 2

| Effect | Operating Temperature, °C. | Vapor Temperature, °C. | Pressure, mm. Hg | Boiling Point Elevation |
|---|---|---|---|---|
| 1st | 250–280 | 172 | 760 | 100 |
| 2nd | 126 | 120 | 1,800 | 6 |
| 3rd | 110 | 103 | 760 | 7 |

The product withdrawn from the first stage was 90% by weight NaOH.

*Example 3*

An aqueous brine containing 26% by weight of NaCl was concentrated so that for each 100 kg. of feed, a slurry containing 21 kg. of NaCl crystals and 16 kg. of mother liquor was discharged. The operation was conducted by parallel feeding to three effects, each of which was heated by another heat carrier, as follows:

1st effect: A $C_8$–$C_9$ hydrocarbon fraction of B.P. 140° C.
2nd effect: A $C_7$–$C_8$ hydrocarbon fraction of B.P. 120° C.
3rd effect: A $C_6$–$C_7$ hydrocarbon fraction of B.P. 75° C.

Table 3 below shows the operating conditions:

TABLE 3

| Effect | Temperature of discharged brine, °C. | Vapor Temperature, °C. | Pressure, mm. Hg |
|---|---|---|---|
| 1st | 129 | 120 | 1,150 |
| 2nd | 120 | 105 | 760 |
| 3rd | 95 | 90 | 650 |

The three evaporating vessels had a capacity of 12 liters each. The feed was introduced into each effect at a rate of 80 liters per hour. In spite of the different working conditions in each effect, the composition of the discharged product was substantially uniform for all three effects.

What I claim is:

1. A process for the separation in a plurality of stages of volatile solvent from a feed liquid containing said solvent and a solute, which includes the steps of:
   vaporizing a heat carrier liquid hydrocarbon fraction which is immiscible with said feed liquid,
   in a first vaporization zone contacting said feed liquid with the vaporized heat carrier liquid to vaporize at least a portion of said solvent and condense only a portion of said vaporized heat carrier liquid so contacted,
   collecting and then separating the concentrated feed liquid from the condensed heat carrier liquid,
   passing the vaporized solvent and remaining vaporized heat carrier liquid in heat exchange relation with a second portion of the heat carrier liquid which is immiscible with said feed liquid to condense said vaporized solvent and said remaining vaporized heat carrier liquid and vaporize said second portion of the heat carrier liquid in heat exchange relation therewith,
   and passing the last mentioned vaporized heat carrier liquid to a second vaporization zone.

2. The process according to claim 1 wherein the heat carrier liquid is the same for both vaporization zones.

3. The process according to claim 1 wherein the heat carrier liquid is different for the two vaporization zones.

4. A multiple effect evaporator process for progressive concentration of a solvent-solute feed liquid, which includes the steps of:
   progressively concentrating the feed liquid in a plurality of vaporization zones by contacting the feed liquid in each zone with a vaporized heat carrier liquid hydrocarbon fraction which is immiscible with the feed liquid to in part vaporize the feed liquid and condense only a portion of the vaporized heat carrier liquid, the heat carrier liquid in each zone being immiscible with the feed liquid,
   collecting and then separating the liquids from each zone,
   passing the separated feed liquid from one zone to another,
   condensing the vapors from each zone and using the heat so obtained in another zone to vaporize the heat carrier liquid thereof,
   and separating the condensed vapors.

5. Apparatus for progressively concentrating a solvent-solute feed liquid, which includes:
   a first evaporator vessel,
   means for introducing feed liquid into said vessel,
   means for vaporizing the liquid of a first heat carrier liquid system comprising a hydrocarbon fraction which is immiscible with the feed liquid,
   means for introducing the vaporized liquid of said first heat carrier liquid system into said vessel in contact with said feed liquid, and at a temperature at least partly to vaporize said solvent and condense only a portion of said vaporized heat carrier liquid,
   means for collecting and separating the liquids from said vessel to produce a stream of concentrated feed liquid and a stream of condensed heat carrier liquid, said stream of heat carrier liquid being directed to said means for vaporizing,
   a second evaporator vessel,
   means for introducing said stream of concentrated feed liquid into said second vessel,
   second means for vaporizing the liquid of a second heat carrier liquid system,
   means for introducing the vaporized liquid of said second system into said second vessel in contact with said concentrated feed liquid, and at a temperature at least partly to vaporize the solvent of said concentrated feed liquid and condense only a portion of said vaporized heat carrier liquid in contact therewith,
   means for collecting and separating the liquids from said second vessel to produce a stream of further concentrated feed liquid and a second stream of condensed heat carrier liquid, said second stream of condensed heat carrier liquid being directed to said second means.

6. Apparatus according to claim 5 wherein the heat carrier liquids of the two systems are the same.

7. Apparatus according to claim 5 wherein the heat carrier liquids of the two systems are different, having different boiling points.

References Cited

UNITED STATES PATENTS

| | | | |
|---|---|---|---|
| 2,976,224 | 3/1961 | Gilliland | 203—10 |
| 3,165,452 | 1/1965 | Williams | 203—11 |
| 3,203,873 | 8/1965 | Wirth | 202—174 |
| 3,219,554 | 11/1965 | Woodward | 203—11 |
| 3,232,847 | 2/1966 | Hoff | 202—173 |
| 3,236,747 | 2/1966 | Margiloff | 203—11 |

FOREIGN PATENTS

38/7,628   5/1963   Japan.

NORMAN YUDKOFF, *Primary Examiner.*

WILBUR L. BASCOMB, JR., *Examiner.*

F. E. DRUMMOND, *Assistant Examiner.*